Figure 1:
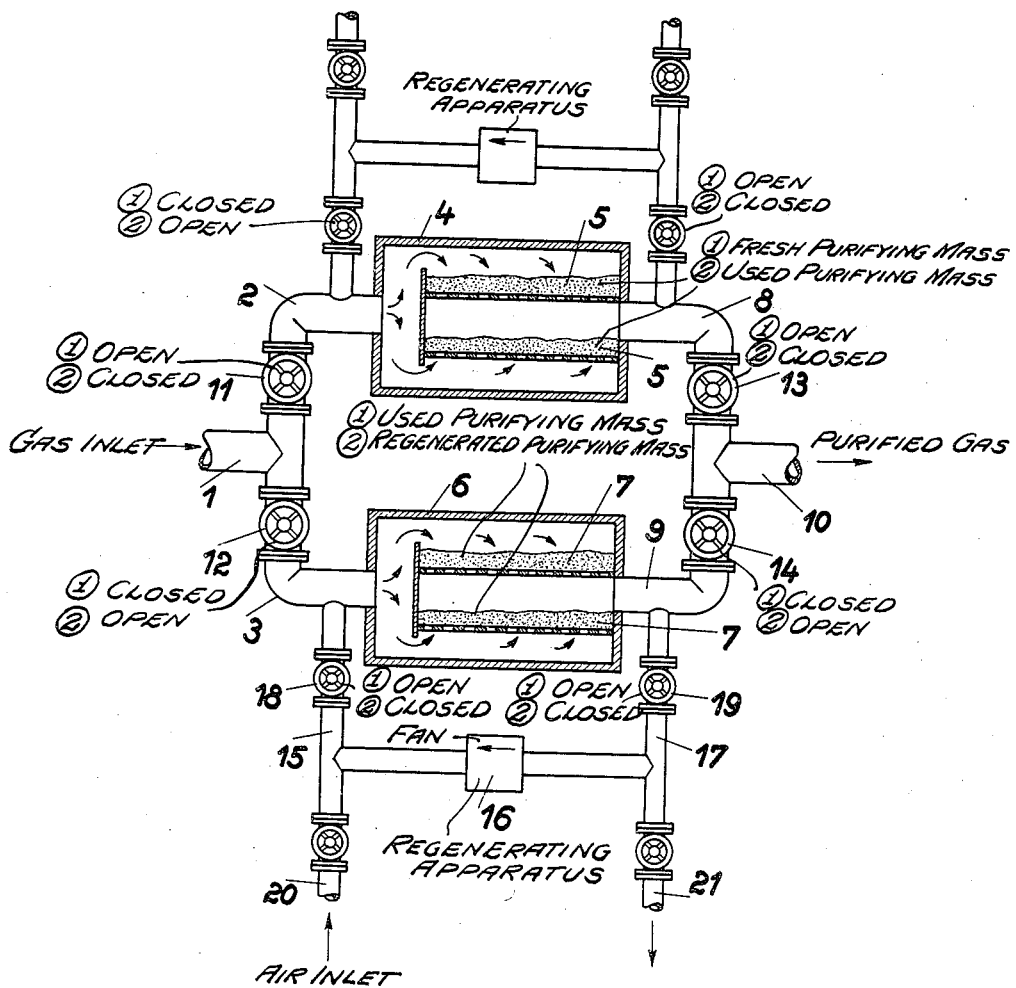

Feb. 6, 1940.  R. MEZGER ET AL  2,189,250
PURIFICATION OF GAS
Filed May 17, 1937  6 Sheets-Sheet 5

Inventors
Robert Mezger
Theo Payer

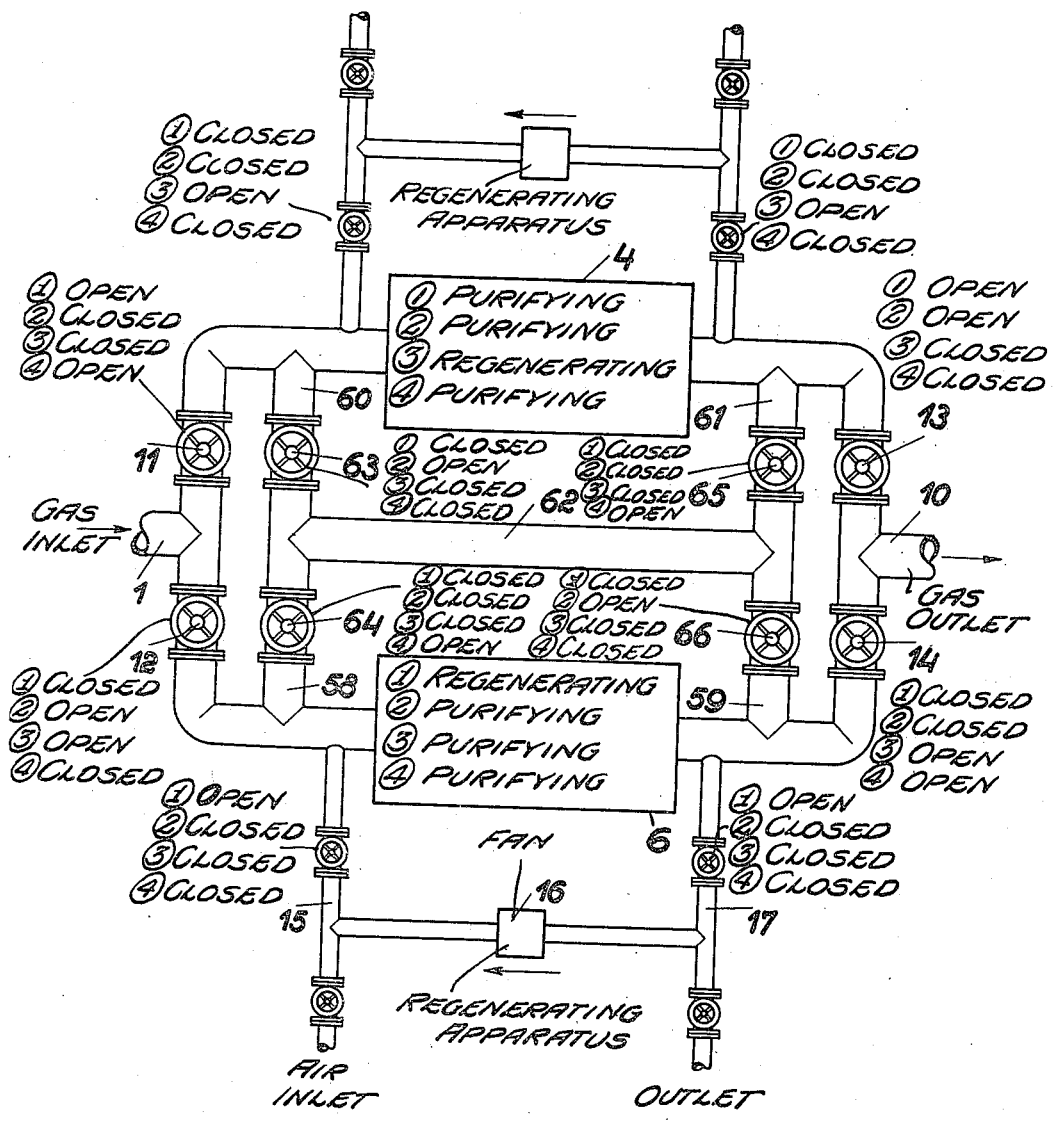

Patented Feb. 6, 1940

2,189,250

UNITED STATES PATENT OFFICE 2,189,250

PURIFICATION OF GAS

Robert Mezger and Theo Payer, Stuttgart, Germany

Application May 17, 1937, Serial No. 143,164
In Germany May 19, 1936

6 Claims. (Cl. 23—3)

Endeavours are at present being made to purify illuminating gas before delivery to the distributing mains in such a manner that on the one hand there is ensured for the gas a favourable combustion at the places where it is to be used and that on the other hand no injury shall occur during the conduction of the gas in the distributing mains through the separation of constituents of the illuminating gas.

Whilst heretofore there has been employed a series of means for the removal of matters that accompany the illuminating gas, as tar mist, ammonia, hydrogen sulphide, naphthalene, etc. or for rendering them harmless, consideration has only very recently been given to the question of the removal of the nitric and other nitrogen oxides (hereinafter included under the term "nitrogen oxide") that are likewise present in illuminating gas. It has been endeavoured to employ metallic sulphides for that purpose.

The purification of the gas as regards nitrogen oxide in a per se known manner by means of metallic sulphides is, however, in the case of the iron sulphide that comes chiefly into question therefor, neither technically nor economically satisfactory because, after its capacity for taking up nitrogen oxide has been exhausted, the exhausted iron sulphide mass becomes ignited in consequence of the heat produced during the regeneration with atmospheric oxygen into iron oxide and sulphur or ferric hydroxide and sulphur. This, particularly with combustible gases, as is the case indeed with illuminating gas, is attended by danger and is in all cases uneconomical because the iron sulphide can be used only once and moreover the valuable sulphur contained therein is lost. The iron oxide formed during this undesirable roasting of the iron sulphide also does not yield on treatment with hydrogen sulphide any sulphide mass that would be capable of again taking up nitrogen oxide.

Now it has been found that it is possible by admixture with iron sulphide, maybe with ordinary accompanying materials, as silica acid, clay, lime, alkali salts and phosphates of organic substances containing humous material to retard or to affect the regeneration of the iron sulphide into iron oxide or ferric hydroxide and uncombined sulphur in its chemical reaction in such a manner as to prevent local overheating resulting from the heat generated by the reaction. In this way there is produced a regeneration of the iron sulphide into iron oxide or ferric hydroxide without combustion of the sulphur to sulphur dioxide, according to which the regenerated product saturated with hydrogen sulphide, can be used again for nitrogen-oxide removal.

Instead of the artificial mixture of substances containing humous material with iron sulphide, there may be employed suitable naturally occurring iron oxide or containing humous material, as bog iron ore; or there may be employed ferric hydroxide, with admixture of substances containing humous material. It is always essential that the added material is admixed in such a relation to the iron oxide or ferric hydroxide that the temperature of equilibrium that occurs between the abstraction of heat and the new formation of heat is no longer sufficient to bring about an ignition of the sulphur that is present. In accordance with the content of humous materials this mass may be course be brought into the desired condition, or iron oxide masses poor in humous material can be added to them if they already contain more humous materials than necessary.

Inert materials may be mixed with the bog iron ore. Inert materials containing water have been found particularly suitable. It is then advantageous for the water contained in the inert materials to be, not free but bound to the inert materials in some way. It suffices if the binding is comparatively loose; as for example is the case in materials containing water of crystallization. What is essential is that the water that is held firmly by the inert carriers is not given off or is not readily given off to the stream of gas passing through the mass. The carrying materials should consequently not be easily desiccated.

Among such inert materials are included bodies that do not enter into any reaction with the nitrogen oxide of the illuminating gas. For example, sand, clay, lime, and kaolin may be used. Sand retains hardly any moisture, but considerable quantities of water can be bound more or less firmly in lime and in clay. Other decayed vegetable materials are suitable for admixing. For example the use of turf-dust or turf litter is advantageous. Also, the addition of fresh lignite to the iron oxide is advantageous. In these materials the water is given off only with much difficulty.

For the purpose of preventing ignition-producing temperatures during the regeneration of iron sulphide saturated with nitrogen oxide it has been found suitable to make the proportion of the humin-containing material to the iron oxide ($Fe_2O_3$) from 1:2 to 1:2.5. If one starts from air-dried material, the percentage content of humin-containing material and the $Fe_2O_3$ taken together, should be as great as possible and consequently about 80 to 90 per cent of the entire mass, the residue of 10 to 20 per cent consisting substantially of hygroscopic water and carbonates.

It has further been ascertained that the efficiency of the purifying masses in the taking up of nitrogen oxide can be increased by first of all subjecting these purifying masses to the action of the gas to be treated and then taking them out of the purifier boxes or purifiers and breaking them up. This mass is then immediately put into the purifiers again.

The slowness of the reaction of the humin-containing bog iron ore exerts the most favourable action inasmuch as on the breaking up there occurs only a separation of nitrogen oxide, whilst the regeneration of the metallic sulphide into sulphur and metallic hydroxide takes place only to a small extent. When then the boxes are put into normal working with the mass so preliminarily treated, it appears that the nitrogen oxide is removed from the gas much more quickly and completely than was the case when the mass was freshly charged. Also the loss of pressure is then less than in the case of fresh mass.

It has been established by exhaustive researches that even in the case of the employment of the purifying masses described the nitrogen oxide is not completely removed from the mass on regeneration. There remains, on the contrary, a residual amount which, when the mass is placed in a current of gas, for example town gas containing hydrogen sulphide, is given up to the gas before the formation of the iron sulphide by the hydrogen sulphide present, which is the presupposition for the taking up of nitrogen oxide with formation of metallic complex salts containing such oxide.

In order nevertheless, for example in the case of the nitrogen oxide purification of gas containing hydrogen sulphide, to render possible the reemployment of the iron oxide masses regenerated in the way described, the method is carried out in two or more purifying apparatus arranged in series. The arrangement of the mass is similar to that in the case of the hydrogen-sulphide purification of coal gas.

Advantageously the apparatus are first of all charged with the purifying mass, and then the gas to be purified, which is as free from air as possible, is passed through. The nitrogen oxide is not taken up by the mass immediately because there is not yet any iron sulphide present. Iron sulphide is, however, soon formed by the hydrogen sulphide of the gas. To the extent to which this iron sulphide formation proceeds, the taking up of the nitrogen oxide begins in the known manner with formation of the metallic complex compounds containing the oxide. This proceeds until the charge of the first apparatus is completely saturated with nitrogen oxide and has consequently become useless for the further taking up of such oxide. The first apparatus is now disconnected and the current of gas is led to the second one, which is charged with mass capable of taking up nitrogen oxide. The first apparatus is opened and the mass contained therein is either spread out in a thin layer for regeneration in the air or is regenerated by circulating a current of gas and adding to it air or oxygen according to the progress of the regeneration until the completion of the operation.

When suitable masses according to the invention are selected there is only an unimportant and harmless heating of the masses.

It has been found that the regeneration of the mass can be achieved advantageously and with avoidance of any injurious increase of temperature by passing through the container in which the mass is located a gas to which are added very small quantities of air or oxygen. These small quantities of oxygen react it is true with the constituents of the purifying mass, but no reaction whatever can take place in the mass of such strength as to cause injurious heating, because the oxygen is very much attenuated by the large quantity of the remaining gas.

Advantageously the procedure is then such that the box containing mass to be regenerated is short-circuited and the stream of gas caused to circulate. Before the entry of the current of gas into the box a small quantity of air is added and this quantity of gas is drawn off from the circulating current of gas behind the box. In this way the volumetric quantity of the circulating gas always remains the same.

A constructional form of this idea is represented diagrammatically by way of example in Fig. 1. The purifying mass is contained in boxes 4 and 6 consists of a wall 4 or 6 and grids or the like b and c (compare Figure 5). In Figure 1 the purifying mass, which is spread over the grids, is marked with the numerals 5 and 7.

The gas passes into the purifying apparatus through the pipe 1 of the two boxes 4 and 6. According to this constructional form there is always only one connected in the path of the gas for the purpose of bringing about a purification of the gas, whilst in the box disconnected from the path of the gas there takes place at the same time the regeneration of the already used mass contained therein. Let it be assumed that the box 4 is filled with fresh mass, whilst the box 6 contains used mass that is to be regenerated. The valves 12 and 14 are then closed, whilst the valves 11 and 13 allow of the passage of the gas through the apparatus from the pipe 1 through the pipe 2, the box 4, the pipe 8 and the outlet pipe 10.

In the lower half of the system, which is constructed quite symmetrically there takes place simultaneously, as previously mentioned, the regeneration of the used mass in the box 6. The apparatus for regeneration consists of the valves 18 and 19, the pipes 15 and 17, the fan 16, and the inlet pipe 20 and outlet pipe 21 which are provided with valves.

By putting into circuit the fan 16 the gas located in the box 6 is caused to circulate in the direction indicated by the arrows. The small quantity of air necessary for the regeneration is drawn in through the pipe 20 whilst at the back of the fan a quantity of gas corresponding to the quantity of air is drawn off through the pipe 21, so that the average pressure in the entire circulatory system remains approximately constant.

The quantity of the air supplied and the gas drawn off can be adjusted without difficulty by means of the valves in the pieces 20 and 21.

When the mass in the box 4 is used up and the mass in the box 6 is regenerated, the valves 18, 19, 11, 13 are closed and the valves 12 and 14 are opened, so that the gas entering through 1 now passes through the box 6. When the connection is thus made the content of the mass in the box 4 can be regenerated by means of the corresponding regenerating apparatus.

The addition of air may advantageously be automatically regulated and for that purpose there may be provided within the purifying mass a heat-sensitive device that indicates increases of temperature. A thermo regulator connected therewith may be used for throttling the addition of air when the temperature rises and for increasing the admixture of air when the temperature falls.

Figure 2:
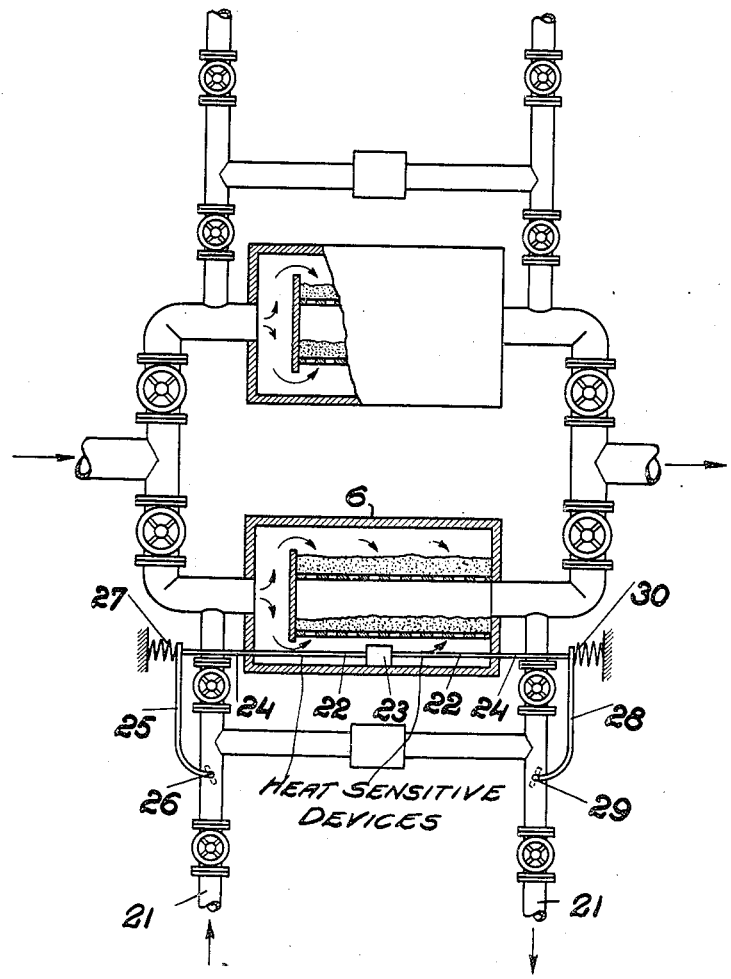

A constructional form of this idea, given by way of example, is shown in Figure 2. The arrangement of the boxes, valves, and fan is the same as in the case of Figure 1. In the box 6 there are built in the two heat-sensitive devices 22 for the regulation of the addition of air and of the outlet of gas during the regeneration. These supply the impulse or the force for the throttling of the pipes 20 and 21 and may comprise a solid liquid, or gaseous expansion body and may also be constructed on the principle of electric impulse senders. In the example given in which the content of the lower box is to be regenerated, there is represented a heat-sensitive device consisting of solid material. Solid expansion bodies 22 are anchored to a fixed body 23 fastened in the wall of the box, so that the expansion bodies can lengthen or shorten outwardly in the case of variations of temperature. The expansion bodies extend through the box walls and gas tight joints are made where they extend therethrough for example by means of stuffing boxes. The outside ends which are marked 24, bear with their free ends against the ends of the levers 25 and 28, which are rigidly connected with the spindles of the throttle valves 26 and 29. The levers are acted upon by the compression springs 27 and 30 for the purpose of producing a yielding connection between 24 and 25 and 28. It will be seen from this drawing that the heat-sensitive devices 22 expand on increase of temperature in the box and the levers 25, 28 are then pressed outwards in opposition to the force of the springs 27, 30. The throttling of the air supply and the gas delivery is thus effected by means of the rotation of the throttle valves 26, 29. The upper box, with the symmetrically built regenerating piping may be provided in the same way with an automatic throttling device for the pipes.

Quantities of heat that are liberated may be removed from the purifier box by cooling the circulating current of gas before it enters the box.

Figure 3:
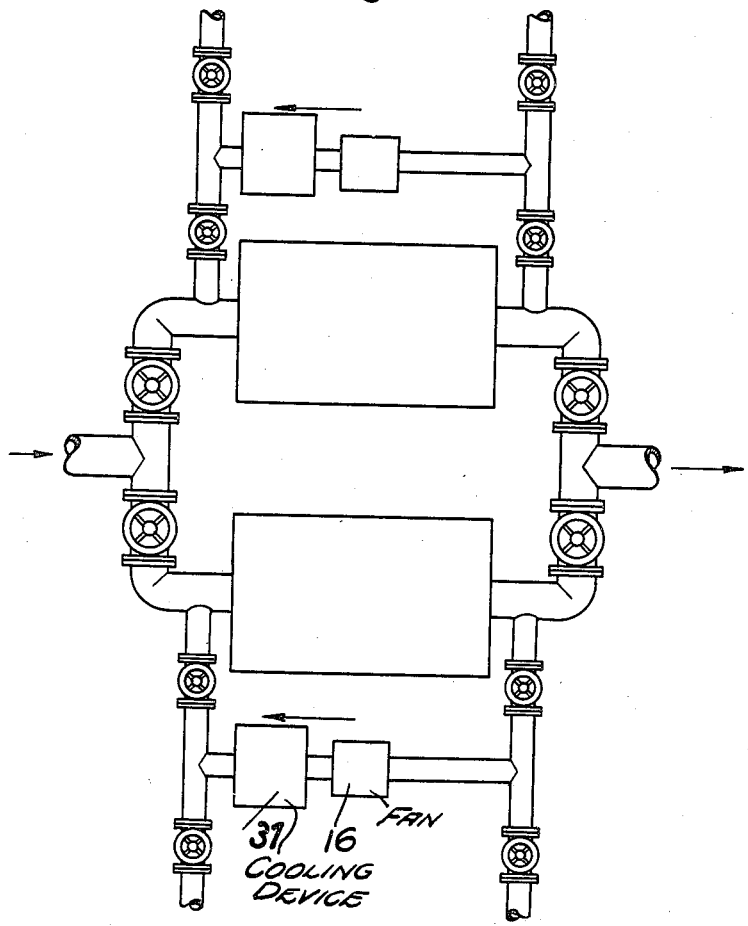

This idea is represented in Figure 3, which agrees with Figure 1 fundamentally but differs therefrom in that a suitable cooling device 31 is inserted into the circuit behind the fan 16.

By maintaining these steps during the regeneration of the mass it is possible to reduce considerably the amount of humin-containing materials that are contained in the purifying mass.

It has further been established that the nitrogen oxide is taken up from the illuminating gas in the form of NO, but that in the metallic complex compounds higher degrees of oxidation, and in fact $N_2O_3$ and $N_3O_4$, appear to be present.

It has therefore appeared that the removal of the nitrogen oxide from the illuminating gas can be effected particularly advantageously by freeing the gas that serves for the regeneration of the mass, after it leaves the box, of the nitrogen oxide contained in it. This is most simply done by washing the delivered gas with water and simultaneously introducing oxygen for the purpose of bringing about the oxidation of the lower oxides formed in water on the taking up of the nitrogen oxide from the gas.

It is then particularly advantageous to use for the washing of the delivered gases alkaline lyes, as for example ammoniacal liquor or the so-called concentrate of the gas-works itself. The regenerating gas coming from the box for example is then irrigated first of all with the concentrate mentioned, then with gas liquor, and finally with pure water, in order to take up the last traces of volatile compounds, and also to wash out the lye mists or ammoniacal vapours carried along in the first part of the washing. Also, part of the ammonia may be left in the regenerating gas current and thus an alkalization of the mass produced. There is thus obtained the neutralization of any humic acids that may be present and consequently an activation for the taking up of nitrogen oxide. The concentrated washing solution may be caused to crystallize by evaporation.

Figure 4:
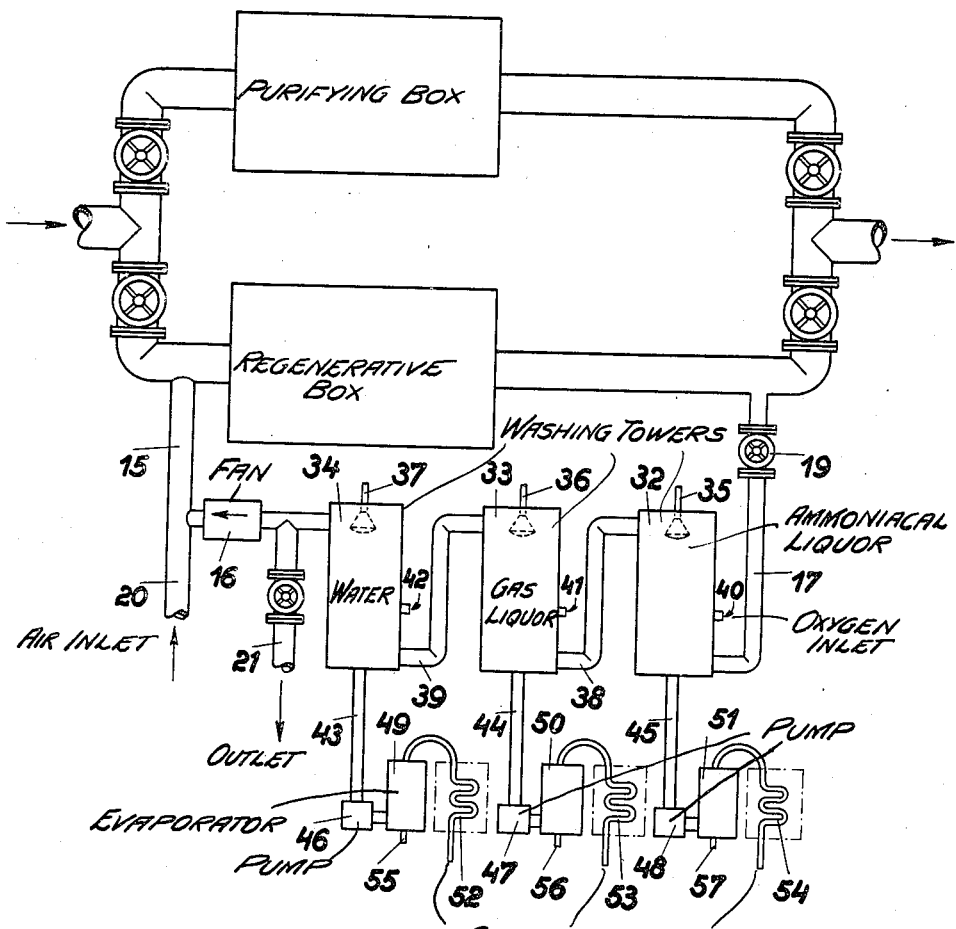

A constructional form of this idea is shown in Figure 4. The arrangement of the boxes is similar to that of Figures 1-3. Also the arrangement of a part of the short-circuit piping 15, 16 is the same; but in the other parts of the short-circuit piping namely in the piping 17, there is inserted into the circuit a series of washing towers 32, 33, 34, the number of which corresponds to the number of the washing stages for the time being, and which are connected together by the connections 38 and 39. The towers are provided with roses or the like 35, 36, 37 by means of which the washing liquid is finely divided. The gas entering the first washer 32 at the bottom through 19 and 17 is irrigated by the delivering of ammoniacal liquor or concentrate through the rose 35, whilst the gas travels upwards. A little oxygen may be introduced simultaneously through the nipple 40. The gas drawn off through 38 passes into the second tower 33 in the same way, the gas being washed with gas liquor by means of the rose 36. In this case also oxygen may be introduced through the nipple 41. In the last tower 34, the gas, which is kept in movement through the entire system by means of the fan 16, is washed with water. The liquids collecting in the washers are led away by means of the liquid pumps 46, 47 and 48, through the pipes 43, 44 and 45 and conducted into the evaporators 49, 50 and 51, which serve by means of suitable heating for the separation of the liquid and the solid components. The liquid components, which leave the evaporators in the form of vapour, are condensed in the cooling coils 52, 53 and 54 and are returned to the roses 35, 36 and 37 in this condition or with addition of ammoniacal liquor or concentrate or gas liquor. The precipitated salt may be drawn off out of the evaporators through 55, 56, 57. This step is particularly advantageous when the saturated purifying mass is regenerated by means of a circulating current of gas. The circulating current of gas is freed from all nitrogen oxide before it passes again into the box. The regeneration of the used mass is thus attained in a particularly short time.

Figure 5:
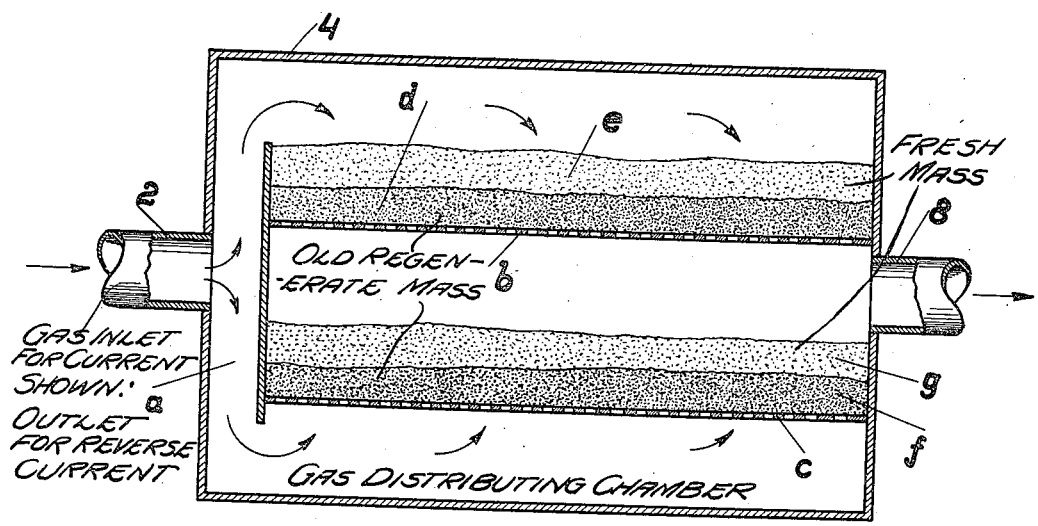

In the arrangement of the mass it is advantageous to observe the order illustrated by Figure 5.

4 is a container for the mass, which has at 2 and 8 pipes for the entry and exit of the gas. $a$ is the gas-distributing chamber, and $b$ and $c$ are the grids upon which the purifying mass is placed.

When the box is to be put into operation, according to the invention the upper grid $b$ is first covered with a layer $d$ which consists of old regenerated mass. As already stated above, this mass still contains nitrogen oxide. There is laid thereupon a layer $e$ of new and still unused mass. The lower grid $c$ is covered in the reverse order. The lower layer $f$ consists of new and yet unused mass whilst the upper layer $g$ consists of old mass.

At the beginning of the working the box is used in such a manner that the entry of gas takes place through the pipe 2 and the exit of gas through the pipe 8. The gas then travels in the direction of the arrows from the distributing chamber $a$ under and over the grids $c$ and $b$ respectively, is forced through the layers of the purifying mass, and leaves the box through the pipe 8. In this state of working the box should be loaded only lightly. The fresh purifying mass takes the hydrogen sulphide out of the gas and is thereby activated for the taking up of nitrogen oxide. At this time the nitric oxide can be taken out of the gas by means of the new mass only in accordance with the new formation of metallic sulphide. The nitrogen oxide still present in the old mass is retained in it as long as no metallic sulphide is formed therein. The operation is therefore such that the new mass is converted as to two-thirds or three-fourths into metallic sulphide. In this way it is made absolutely certain that in the old mass there can take place no formation of metallic sulphide and consequently also no removal of nitrogen oxide. As soon as sufficient metallic sulphide has been formed in the new mass, the current of gas is caused to pass through the box in the direction opposite to the original direction. The gas then passes through the pipe 8 through the old mass $d$, and through the new mass $e$ to the pipe 2 which is now the outlet pipe. There are then formed in the old mass metallic sulphides which cause the removal of the last remnant of nitrogen oxide from the old mass. These are caught in the succeeding new mass activated by metallic sulphide formation, just as the nitrogen oxide contained in the gas is there taken up and rendered harmless. The box is now suitable for full working and may be heavily loaded in the ordinary way.

The procedure may however be such that when the mass is regenerated—i. e., when the iron sulphide has been reconverted into uncombined sulphur and iron oxide or hydroxide and most of the nitrogen oxide has been removed—mass thus regenerated is inserted into the current of gas in the first place. The gas that passes through now removes chiefly the nitrogen oxide still contained in the mass of the first box and carries it into the second box where it is taken up with certainty. In the meantime iron sulphide is formed in the first box. To the same extent as that to which this sulphide is formed, nitrogen oxide is taken up from the gas. This switching over to the different boxes is repeated until the purifying mass in the first box has reached a content of sulphur that is sufficient for selling. At present such sulphur-containing masses are not of any value unless they have a content of 35 per cent of sulphur, a content of sulphur which can never be attained with a single use of the mass. When the mass is finally to be changed, the first box is charged with a suitable mass and the current of gas is passed through it until iron sulphide has been formed. It is then connected in the second place as the box that is most capable for taking up nitrogen oxide whilst the box that has hitherto been in the second place is connected in the first place in the current of gas.

Such an arrangement is shown in Figure 6. In this case two boxes co-operate in the following way:

Let it be assumed that the box 4 is filled with purifying material that is still capable of taking up energetically, whilst the content of the box 6 is already completely used up. In this case the valves 12, 14, 64 and 66, 63 and 65 are closed and 11 and 13 are open. The gas then enters at 1, passes by way of the valve 11 and the box 4, and escapes by way of 13 and through 10. At the same time the content of the box 6 is regenerated by the circulation of the gas contained therein by means of the fan 16 with addition of air in the manner already described.

At this instant the capacity of the matter inserted in 4 for taking up nitrogen oxide has already considerably decreased although it has not entirely disappeared.

At this instant the valve 11 is closed, whilst the valves 12, 66 and 63 are opened. The valves of the circuit 15, 16, 17 are simultaneously closed. The stream of gas now travels by way of 1 and 12, passes through the box 6 and then by way of 66, the pipe 62, the valve 63 and the box 4, and escapes by way of 13 to 10. Consequently the two boxes are connected in series, and in fact, in the path of the stream of gas there are first the quite freshly regenerated box 6 and then the mass in the box 4 which is already mostly used up. The nitrogen oxide is chiefly taken up in the box 4 whilst sulphides gradually form simultaneously in the box 6. The sulphide formation renders the freshly regenerated mass suitable for taking up nitrogen oxide. When this conversion has taken place to the desired degree, there is effected a fresh switching over, all the more as the mass in the box 4 is now completely used up.

The valves 11, 13, 63 and 66 are now also closed, so that the gas entering at 1 passes over only the content of the box 6 and then passes out at 10. During this time the regeneration of the content of the box 4 may be effected by the circulating gas in the upper short-circuit piping.

In the next working period, by the closure of all the valves with the exception of 11, 65, 64 and 14 the gas is caused to pass first through the box 4 and then through the box 6 until the mass in the first box has been converted into sulphide and the content of the box 6 is used up. A continuous working and a concentration of the sulphur can be ensured by the complete switching over from 4 to 6 and vice versa.

What we claim is:

1. The hereinbefore described method of gas purification comprising subjecting gas containing nitrogen oxide to contact with mass comprising metallic sulphide and humous material, and regenerating said mass thus caused to take up nitrogen oxide so as to separate out nitrogen oxide and to convert metallic sulphide into metallic oxide and uncombined sulphur, said humous material being of an amount such as to prevent ignition producing temperature during said regenerating, and said regenerating being effected by means of a current of gas containing a small quantity of oxygen.

2. The hereinbefore described method of gas purification comprising subjecting gas containing nitrogen oxide to contact with mass comprising metallic sulphide and humous material, and regenerating said mass thus caused to take up nitrogen oxide so as to separate out nitrogen oxide and to convert metallic sulphide into metallic oxide and uncombined sulphur, said humous material being of an amount such as to prevent ignition producing temperature during said regenerating, said regenerating being effected by means of a current of gas, a small quantity of air being added to said current before its entry into the box containing the mass to be regenerated and the same volume of gas being withdrawn from said current after its exit from said box.

3. The hereinbefore described method of gas purification comprising subjecting gas containing nitrogen oxide to contact with mass comprising metallic sulphide and humous material, and regenerating said mass thus caused to take up nitrogen oxide so as to separate out nitrogen oxide and to convert metallic sulphide into metallic oxide and uncombined sulphur, said humous material being of an amount such as to prevent ignition producing temperature during said regenerating, and said regenerating being effected by means of a current of gas containing a small quantity of oxygen and cooled before its entry into the box containing the mass to be regenerated.

4. The hereinbefore described method of gas purification comprising subjecting gas containing nitrogen oxide to contact with mass comprising metallic sulphide and humous material, and regenerating said mass thus caused to take up nitrogen oxide so as to separate out nitrogen oxide and to convert metallic sulphide into metallic oxide and uncombined sulphur, said humous material being of an amount such as to prevent ignition producing temperature during said regenerating, and said regenerating being effected by means of a current of gas containing a small quantity of oxygen, said quantity of oxygen being regulated automatically in dependence on the temperature of the mass to be regenerated.

5. The hereinbefore described method of gas purification comprising subjecting gas containing nitrogen oxide to contact with mass comprising metallic sulphide and humous material, and regenerating said mass thus caused to take up nitrogen oxide so as to separate out nitrogen oxide and to convert metallic sulphide into metallic oxide and uncombined sulphur, said humous material being of an amount such as to prevent ignition producing temperature during said regenerating, and said regenerating being effected by means of a current of gas containing a small quantity of oxygen and free from nitrogen oxide.

6. The hereinbefore described method of gas purification comprising subjecting gas containing nitrogen oxide to contact with mass comprising metallic sulphide and humous material, and regenerating said mass thus caused to take up nitrogen oxide so as to separate out nitrogen oxide and to convert metallic sulphide into metallic oxide and uncombined sulphur, said humous material being of an amount such as to prevent ignition producing temperature during said regenerating, and said regenerating being effected by means of a current of gas containing a small quantity of oxygen and free from nitrogen oxide, the used regenerating gas being washed with ammoniacal liquor.

ROBERT MEZGER.
THEO PAYER.